US006798407B1

(12) United States Patent
Benman

(10) Patent No.: US 6,798,407 B1
(45) Date of Patent: Sep. 28, 2004

(54) SYSTEM AND METHOD FOR PROVIDING A FUNCTIONAL VIRTUAL ENVIRONMENT WITH REAL TIME EXTRACTED AND TRANSPLANTED IMAGES

(76) Inventor: William J. Benman, 2154 Benecia Ave., Los Angeles, CA (US) 90025

( * ) Notice: Subject to any disclaimer, the term of this patent is extended or adjusted under 35 U.S.C. 154(b) by 253 days.

(21) Appl. No.: 09/905,692

(22) Filed: Nov. 28, 2000

(51) Int. Cl.$^7$ .............................................. G06T 15/00
(52) U.S. Cl. ...................... 345/419; 345/473; 345/734; 345/738; 345/756; 345/757
(58) Field of Search ................................ 345/418, 419, 345/584, 473, 734, 738, 756, 757, 758, 582

(56) References Cited

U.S. PATENT DOCUMENTS

| 5,786,822 | A | * | 7/1998 | Sakaibara et al. | 345/582 |
| 5,966,130 | A | * | 10/1999 | Benman, Jr. | 345/418 |
| 5,973,697 | A | * | 10/1999 | Berry et al. | 345/418 |
| 6,020,931 | A | * | 2/2000 | Bilbrey et al. | 348/584 |
| 6,084,590 | A | * | 7/2000 | Robotham et al. | 345/419 |
| 6,201,544 | B1 | * | 3/2001 | Ezaki | 345/419 |
| 6,377,263 | B1 | * | 4/2002 | Falacara et al. | 345/473 |
| 6,476,802 | B1 | * | 11/2002 | Rose et al. | 345/419 |
| 6,611,268 | B1 | * | 8/2003 | Szeliski et al. | 345/473 |

* cited by examiner

Primary Examiner—Mark Zimmerman
Assistant Examiner—Kimbinh T. Nguyen

(57) ABSTRACT

A system and method for providing a functional virtual environment with real time extracted and transplanted images. The system includes hardware and software for providing a multi-dimensional computer generated environment and for receiving a plurality of extracted video images. The system is adapted to transplant the extracted video images into the environment in a manner that preserves the virtual metaphor thereof. In the illustrative embodiment, a realistic virtual city is created in accordance with the Virtual Reality Modeling Language (VRML) protocol. The extracted images are transplanted onto an object in the environment as a texture. In the best mode, the object is invisible. The extracted video images are streamed continuously into the environment such that a live real time interaction is enabled. The environment is networked and the system is adapted to receive multiple simultaneous streams which are transplanted and exported to enable a virtual community. Within the community, users seated in their native environment, appear to walk when navigating due to the unique teaching of the present invention by which a series of stored extracted images of the user walking are transplanted into the environment and replayed for so long as the user is navigating. A separate series is displayed to each person within a predetermined range of the walker that has the walker in his field of view depending on the viewing angle of the observer. A master copy of the environment is stored on a server and downloaded to each client on the network as part of a setup process. Thereafter, local changes in the environment are uploaded to the server and subsequently downloaded to selected clients as updates. The environment will support private areas and the system is adapted to allow extracted video streams within private environments to be sent to each person in the private environment directly, bypassing the server.

34 Claims, 4 Drawing Sheets

SYSTEM AND METHOD FOR PROVIDING A FUNCTIONAL VIRTUAL ENVIRONMENT WITH REAL TIME EXTRACTED AND TRANSPLANTED IMAGES

BACKGROUND OF THE INVENTION

1. Field of the Invention

The present invention relates to image processing systems and techniques live video and computer generated imagery. More specifically, the present invention relates to systems and techniques for providing live image data in a computer generated environment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

U.S. Pat. No. 5,966,130 entitled Integrated Virtual Networks issued Jul. 21, 1998, to W. J. Benman, the teachings of which are incorporated herein by reference and hereinafter referred to as the '130 patent discloses and claims a computer-based system which allows a user to see a realistic three-dimensional representation of an environment, such as an office, on a computer screen. Real world functionality is mapped onto numerous objects in the environment with a motion based input system allowing the user to use the objects in the environment (e.g., computer, desk, file cabinets, documents, etc.) in same manner as the objects would be used in the real world.

In addition, Benman's system allows the user to travel into the work areas of coworkers and see and interact with live images of the coworkers in the environment. In order to display an image of the user or a coworker in the environment, it is necessary to remove any background imagery inconsistent with the computer-generated environment from the transplanted image prior to display. For example, if the coworker is in a remote office using a computer equipped with software effective to create a virtual environment as described by Benman, and the user has a wall, window, bookshelf or other scene in the background, that information would have to be removed in order to place the person's image into the virtual environment in such a way as to create an image of the person sitting in the computer generated office environment.

Use of monochromatic (e.g., blue and green) screens have been used in television and film productions to extract a foreground image and overlay it over a background image. For example, this process is used daily in television to allow a person standing in front of a blue screen to have their image extracted and combined with a video image of a map to provide a weather report.

However, it would be impractical to require each coworker located in an office, hotel, home or other environment to have a monochromatic background. Accordingly, there was a need for an image processing system or technique which could transplant a desired image from one scene into another scene regardless of the background in the first scene. The need in the art was addressed by Benman in copending U.S. patent application Ser. No. 09/363,456 filed Jul. 29, 1999, and entitled SYSTEM AND METHOD FOR EXTRACTING IMAGES WITHOUT MONOCHROMATIC BACKGROUND hereinafter the '456 application. This application discloses and claims a novel method for extracting a foreground image from a background environment using a novel image processing system which does not require use of a monochromatic screen.

However, a need remains for a system and method for transplanting the uniquely extracted foreground image into a computer-generated (virtual) environment in real time.

Further, U.S. patent application Ser. No. 60/190,586, filed Mar. 20, 2000 by Benman and entitled Functional Three-Dimensional Web Site with Dynamic Image Extraction and Transplantation hereinafter the 'Web site' application, disclosed and claimed a novel system and method for creating a community experience in a web based virtual world. To realize the vision proposed by Benman in the Web site application, a technique is needed for simulating navigation (e.g., walking) of a user in the environment with the same degree of realism to be provided in virtual face-to-face interaction in the environment.

With multiple users walking around in the environment, a system is needed for changing the realistic appearance of the user as the user walks past a viewer without resort to use of animated characters, robot like avatars or three-dimensional icons as is common in the art.

Further, inasmuch as the system is to be implemented on a large scale, multiple simultaneous streams of live image data will have to be routed through a server. This could place inordinate demands on the throughput of the system and the processing power thereof. Hence, there will be a need for a system for effecting stream routing without requiring each stream to go through a dedicated server.

Finally, there will be a need for further improvements to the environment to add realism while taking advantage of the power afforded by the creation and control of the world in cyberspace.

SUMMARY OF THE INVENTION

The need in the art is addressed by the system and method of the present invention. One aspect of the invention is a system for transplanting extracted video image data. The system includes hardware and software for providing a multidimensional computer generated environment and for receiving a plurality of extracted video images. The system is adapted to transplant the extracted video images into the environment in a manner that preserves the virtual metaphor thereof.

In the illustrative embodiment, a realistic virtual city is created in accordance with the Virtual Reality Modeling Language (VRML) protocol. The extracted images are transplanted onto an object in the environment as a texture. In the best mode, the object is invisible. The extracted video images are streamed continuously into the environment such that a live real time interaction is enabled. The environment is networked and the system is adapted to receive multiple simultaneous streams which are transplanted and exported to enable a virtual community.

Within the community, users seated in their native environment, appear to walk when navigating due to the unique teaching of the present invention by which a series of stored extracted images of the user walking are transplanted into the environment and replayed for so long as the user is navigating. A separate series is displayed to each person within a predetermined range of the walker that has the walker in his field of view depending on the viewing angle of the observer.

A master copy of the environment is stored on a server and downloaded to each client on the network as part of a setup process. Thereafter, local changes in the environment are uploaded to the server and subsequently downloaded to selected clients as updates. The environment will support private areas and the system is adapted to allow extracted video streams within private environments to be sent to each person in the private environment directly, bypassing the server.

Additional features of the invention include a system for adjusting the height and color of buildings in the virtual environment based on the amount of average and instantaneous traffic therethrough.

The invention may be implemented on the Internet, an Intranet, a broadcast or multi-cast wired or wireless network.

DESCRIPTION OF THE INVENTION

Illustrative embodiments and exemplary applications will now be described with reference to the accompanying drawings to disclose the advantageous teachings of the present invention.

Figure 1:
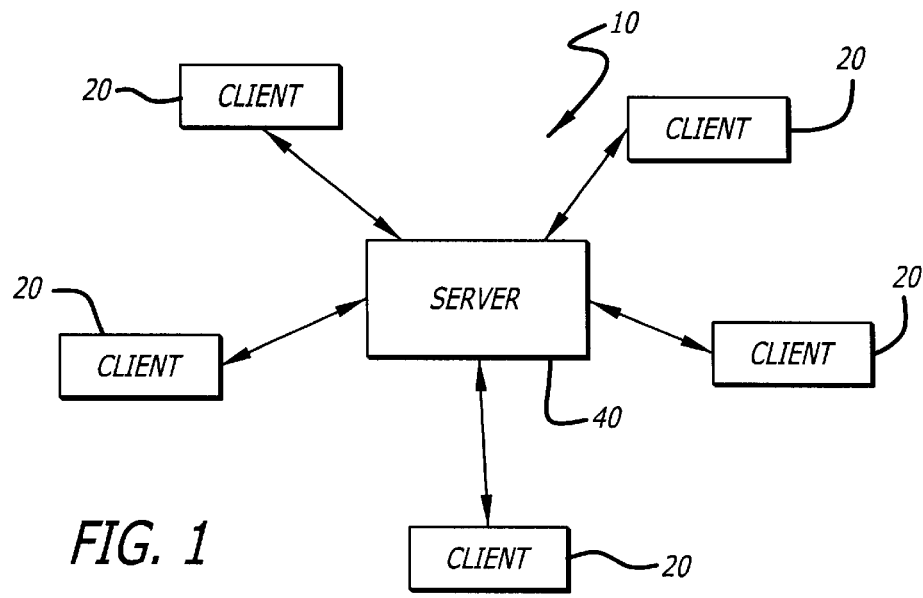
FIG. 1 is a simplified block diagram of a network adapted for use in connection with the teachings of the present invention.

FIG. 1 is a simplified block diagram of a network adapted for use in connection with the teachings of the present invention. The network 10 may be a wired or wireless network. The network 10 may be a public network such as the Internet or a private network such as an Intranet or some combination thereof. Data may be broadcast or multi-cast to a plurality of client machines 20 from a central server 40. As an alternative, data may be communicated from one client to another client directly as discussed more fully below.

Figure 2:
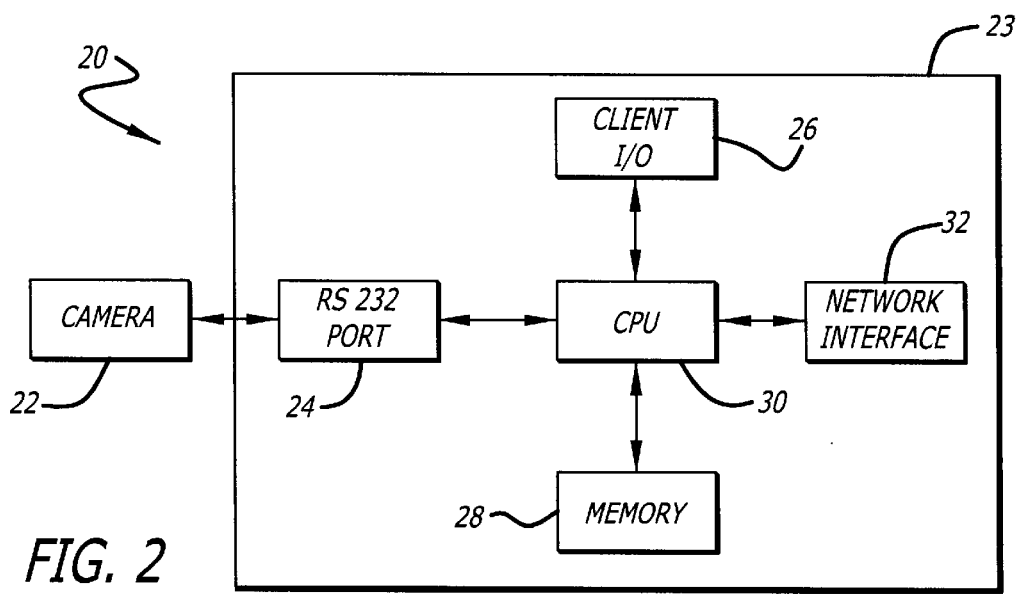
FIG. 2 is a block diagram depicting the hardware architecture of a typical client of FIG. 1 in accordance with the teachings of the present invention.

FIG. 2 is a block diagram depicting the hardware architecture of a typical client of FIG. 1 in accordance with the teachings of the present invention. The illustrative client system 20 includes a video camera 22 which may be conventional web camera or a high performance digital video camera. One aspect of the invention is a system for transplanting extracted video image data. The camera 22 is operationally coupled to a personal computer (PC) 23 via a wired or wireless connection. The output of the camera 22 is received by the PC 23 via an input port thereof. In a typical implementation, the camera is coupled to the PC via an RS 232 port as is common in the art. Other cameras currently on the market couple to the personal computer via the parallel or serial port or via the keyboard interface thereof. The invention is not limited to the manner by which the camera is coupled to the PC. In practice, several cameras may be used and, in the best mode, the cameras are color cameras.

The RS 232 port couples the camera output to the central processing unit (CPU) 30 of the PC 23. In response to a program stored in memory 28 and inputs received from an input interface 26, the CPU extracts foreground image data in accordance with the method disclosed more fully below and uplinks the extracted image to the network via a network interface 32. The interface 26 may include a keyboard and display as is common in the art. The image extraction code may be embedded within the VRML world code as discussed more fully below.

Figure 3:
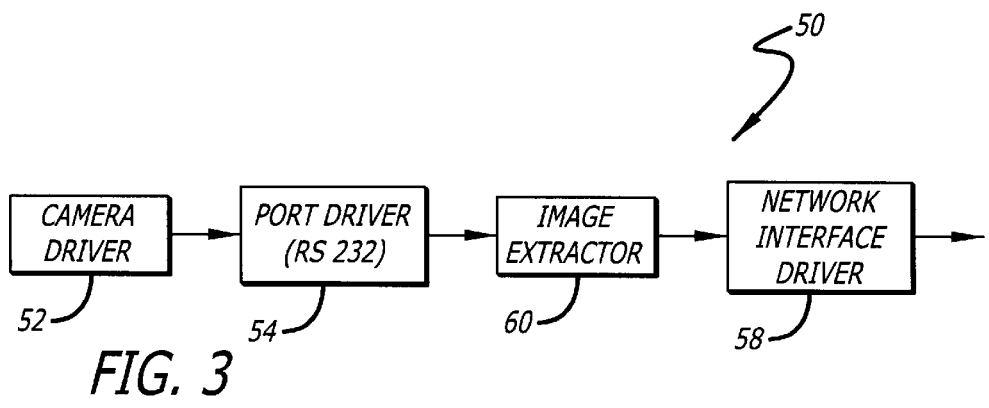
FIG. 3 is a block diagram of an illustrative embodiment of client side uplink software architecture in accordance with the present teachings.

FIG. 3 is a block diagram of an illustrative embodiment of the client side uplink software architecture in accordance with the present teachings. The client software 50 includes a camera driver 52 which controls the operation of the camera 22 of FIG. 1. The driver 52 may run on the camera 22 or on the PC 23. The camera driver 52 delivers data to a port driver 54 which provides interfacing to the operating system of the PC 23.

In accordance with the present teachings, foreground image data is extracted by image extractor software 60 and delivered to the network via a network interface driver 58. The image extractor software may be implemented within the *.wrl VRML world code discussed below with respect to FIG. 7.

Figure 4:
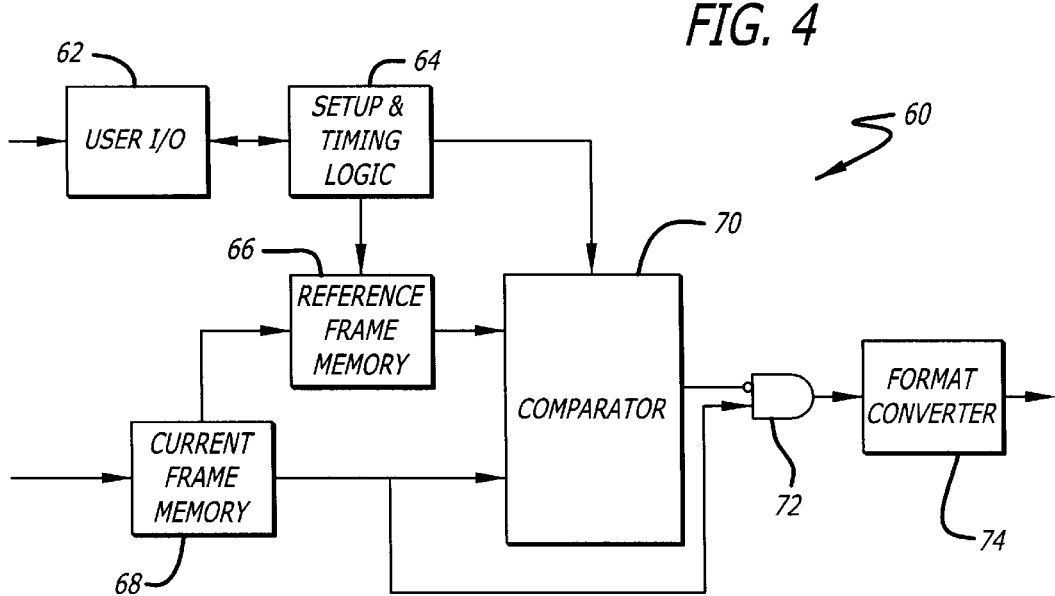
FIG. 4 is a block diagram of an illustrative implementation of the software architecture of the image extractor of FIG. 4 in detail.

FIG. 4 is a block diagram of an illustrative implementation of the software architecture of the image extractor of FIG. 3 in detail. As discussed in copending U.S. patent application Ser. No. 09/363,456 filed Jul. 29, 1999 by W. Benman and entitled System And Method For Transplanting Images Without Monochromatic Background, the teachings of which are incorporated herein by reference, the image extractor 60 includes a user interface 62 which provides user prompts and receives user input. Setup and timing logic 64 provides user prompts and controls system timing. In an initial setup mode, in response to the setup and timing logic 64, a first frame of image data from the camera 22 is stored in a first memory 66. As discussed in the above-referenced patent application, the reference frame is basically a snap shot of the user's background environment without the user being present in the frame. After the reference frame is stored, the user enters the field of view of the camera 22 and the system 20 enters an operational mode by which a series of current frames are stored in a second memory 48. Each current frame is compared to the reference frame by a comparator 70 on a pixel by pixel basis. In the illustrative embodiment, the comparison is performed digitally. For each pixel, the color and intensity values between the current frame and the reference frame are compared and if there is a match, the output of the comparator goes high. The output of the comparator is inverted and applied as a first input to an AND gate 72. A second input to the AND gate 72 is provided by the current frame memory 68. In response, the output of the comparator, the AND gate 72 selectively gates the current frame to a format converter 74 only if, on a pixel by pixel basis, it differs from the reference frame. Those skilled in the art will appreciate that, up to this point, the system 60 has effectively extracted a dynamic foreground image of an object (presumably the user).

While a static background is preferred, in accordance with the present teachings, the background may actually be dynamic after a window is established around the target foreground image. Other well-known image processing techniques may be employed to allow the system to operate with a dynamic background. In addition, the present invention is not limited to the manner by which a foreground image of the user is extracted. The present teachings may be used in conjunction with a conventional monochromatic image extraction system as will be appreciated by those skilled in the art.

In the illustrative embodiment, the extracted image is converted from JPEG (Joint Pictures Expert Group) to PNG (Portable Networks Graphics) standard by the format converter 74. As is well-known in the art, the PNG format supports alpha-transparency. Alpha-transparency is useful in the present application inasmuch as it allows the foreground image to be transplanted into a three-dimensional environment as an object, occluding background objects and being occluded by foreground objects, as discussed more fully below. Nonetheless, the present teachings are not limited to the format of the extracted image. Other formats may be used as desired for a particular application.

The output of the format converter 74 is input to the network interface driver 58 of FIG. 3. The network interface driver 58 may include an FTP (file transfer protocol) server and a web server as will be appreciated by those skilled in the art. The network interface driver 58 of each client 20 communicates with an uplink network interface running on the server 40.

Figure 5:
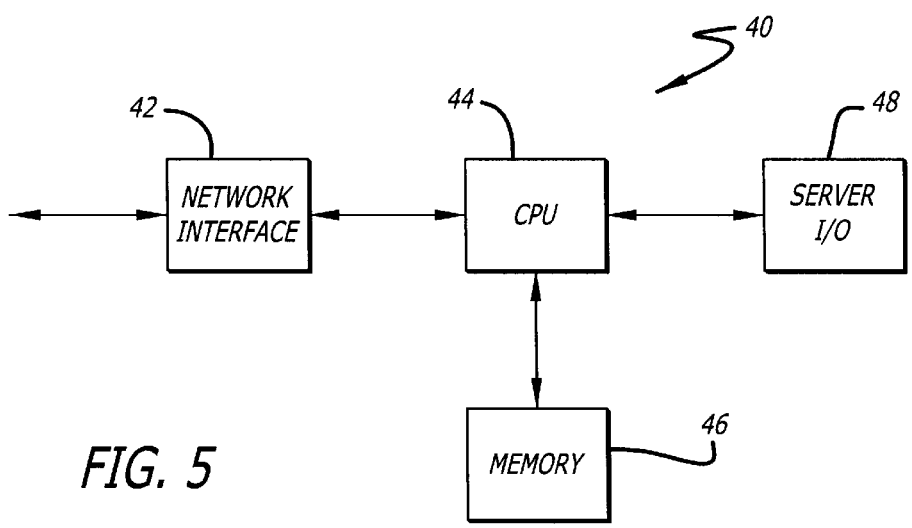
FIG. 5 is a block diagram of an illustrative implementation of the hardware of the server of FIG. 1.

FIG. 5 is a block diagram of an illustrative implementation of the hardware at the server of FIG. 1. In the illustrative embodiment, the server 40 includes a network interface 42 adapted to communicate with the network interface 32 of each client machine. Those skilled in the art will appreciate that the network 10 is scaleable and may include several servers adapted to communicate with each other as well as with a number of client machines. Each server includes a CPU 44 programmed by software stored in a memory 46 to control the operation of the server in accordance with the present teachings as discussed more fully herein. The server 40 may be operated locally via an input/output interface 48 that might include a keyboard and a display by way of example.

Figure 6:
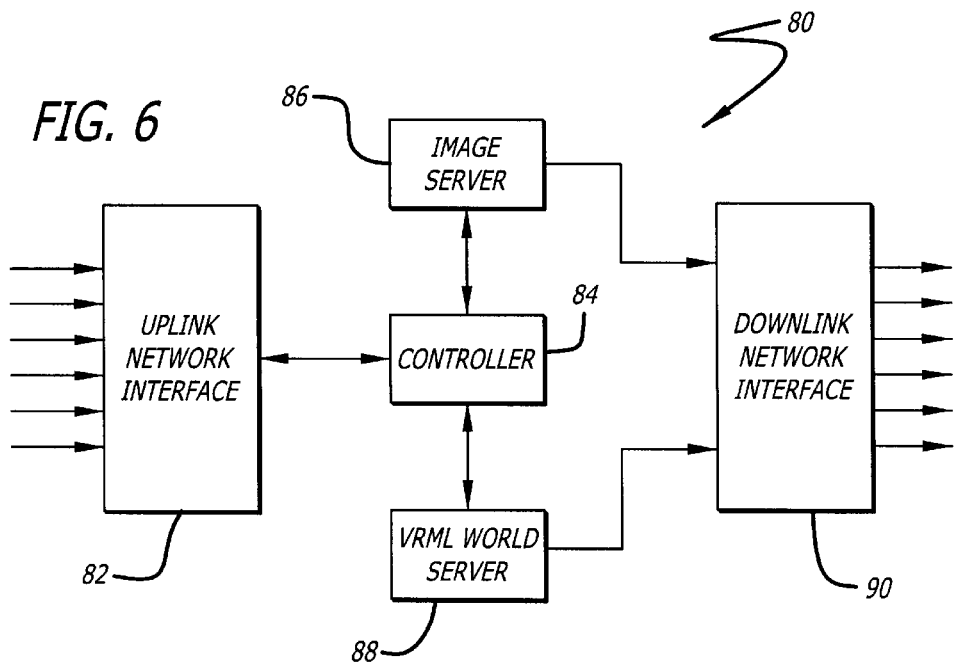
FIG. 6 is a simplified block diagram of the software architecture on the server in accordance with the present teachings.

FIG. 6 is a simplified block diagram of the software architecture on the server in accordance with the present teachings. The server software architecture 80 includes a network interface driver 82 which includes FTP and web servers is adapted to communicate with the client side network interfaces drivers 58. Image data received via the uplink network interface 82 is routed to an image server 86. Client side world changes are routed to a VRML world server 88. The world server keeps track of the objects in the world and the locations of the users. World servers are known in the art, see *Networked Virtual Environments* by Sandeep Singhal and Michael Zyda, published by Addison-Wesley (1999). The world server 88 sends environment or world data to each client as part of a setup operation and updates thereafter. Of course, initial world data may also be distributed via other means such as delivery on a stored media such as a CD ROM.

When the position of the user is ascertained in the VRML world, the user's direction and field of view may be ascertained. Depending on the line-of-sight of each user, and in response to data from the world server 88 and the controller 84, the image server 86 connects the appropriate streams to the appropriate clients. For real time image streams, the image server is best implemented as an N×M crossbar switch capable of directing one to N of the N input streams to any one to M of the M outputs, where N is the number of client machines and N=M. However, the image server 86 may also include memory for storing extracted image sequences such as an sequence of frames showing a person walking from plural angles in accordance with the present teachings.

Image and world update data is then downloaded to each client via a downlink network interface 90. Those skilled in the art will appreciate that the downlink interface 90 is a mirror image of the uplink interface 82 and may be integral therewith.

Figure 7:
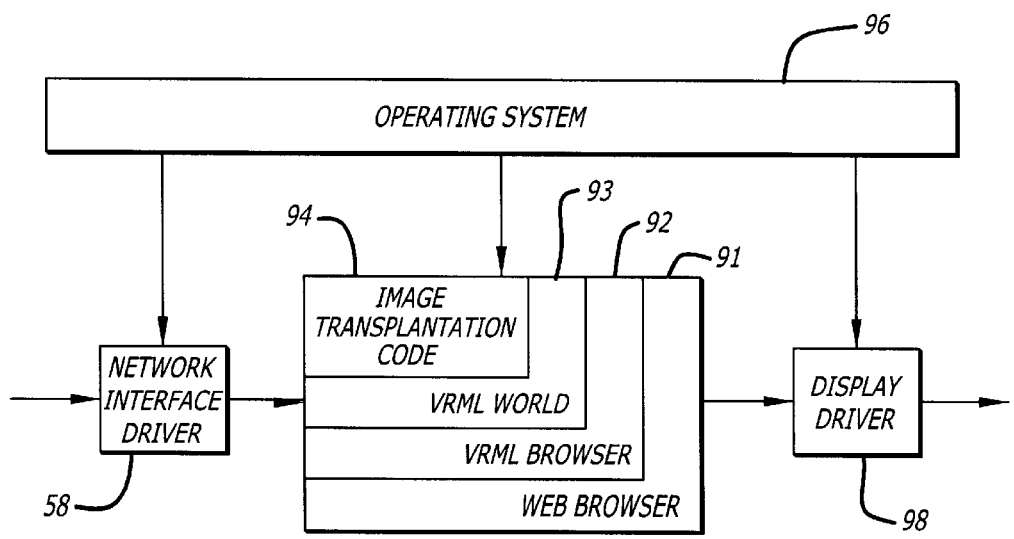
FIG. 7 is a block diagram of an illustrative implementation of the client side downlink software implemented in accordance with the teachings of the present invention.

FIG. 7 is a block diagram of an illustrative implementation of the client side downlink software implemented in accordance with the teachings of the present invention. Image and world data from the network is received by the network interface driver 58 and provided to a web browser 91 running on the client PC. The Web browser (e.g. Internet Explorer™ or Netscape Navigator™ by way of example) 91 includes a VRML browser or plugin 92 such as the Cosmo Player developed by Silicon Graphics or the Cortona Browser developed and sold by Parallel Graphics. A VRML world file 93 runs on the VRML browser 92. The VRML world may be created with any world creation tool currently on the market. For this purpose, Platinum's VRCreator may be used or Internet Space Builder or Internet Scene Assembler from Parallel Graphics. In any event, as mentioned above, in accordance with the present teachings, the VRML world is provided to the client machine by direct download over the network or by CD-ROM and run on the client machine.

In accordance with the present teachings, embedded within the VRML world, or in a separately called routine, is image transplantation code 94. The image transplantation code 94 may be an applet or agent written in Java™, Javascript™, C, $C^{++}$, or any other suitable language as will be appreciated by those of ordinary skill in the art. In accordance with the present teachings, the image transplantation code 94 receives dynamic (e.g. real time) image data streams via the network, creates VRML objects (preferably invisible) in the VRML world and transplants the image streams onto appropriate objects as a texture. The texture changes continuously in response to the received images thereby creating live image data in a computer generated three-dimensional (preferably VRML) world. Thus, an extracted image of a user at a first client machine may be transplanted in real time into the environment displayed at a second client machine and appear therein as a live image and vice versa. The two users may then see each other and converse while interacted in a shared virtual world. This would be useful in a virtual chat room, for example, allowing children to play and interact with each other. Inasmuch as they would be able to see each other, parents can rest assured that there is little likelihood that an ill-intentioned adult may be conversing with the child. Indeed, the rooms may be monitored by a system administrator. Each object will be given an attribute that indicates the user's authority to enter restricted areas. With collision detection turned on by the system administrator, for the objects on which the adult images are transplanted, adults or older children may be kept out of the room. For buildings rented by commercial entities, the walls may be transparent to allow someone outside the building to see the extracted or stored images of those inside to convey a sense of the activity therein. Private offices and personal spaces are enabled as well within which less public business or personal interaction may take place. Additional features of the invention include a system for adjusting the height and color of buildings in the virtual environment based on the amount of average and instantaneous traffic therethrough.

Under the control of the operating system (e.g., Windows 98™, Windows 2000™, Mac OS™) 96, the image and world data is supplied to a display driver 98 for output to a display (not shown).

Figure 8:
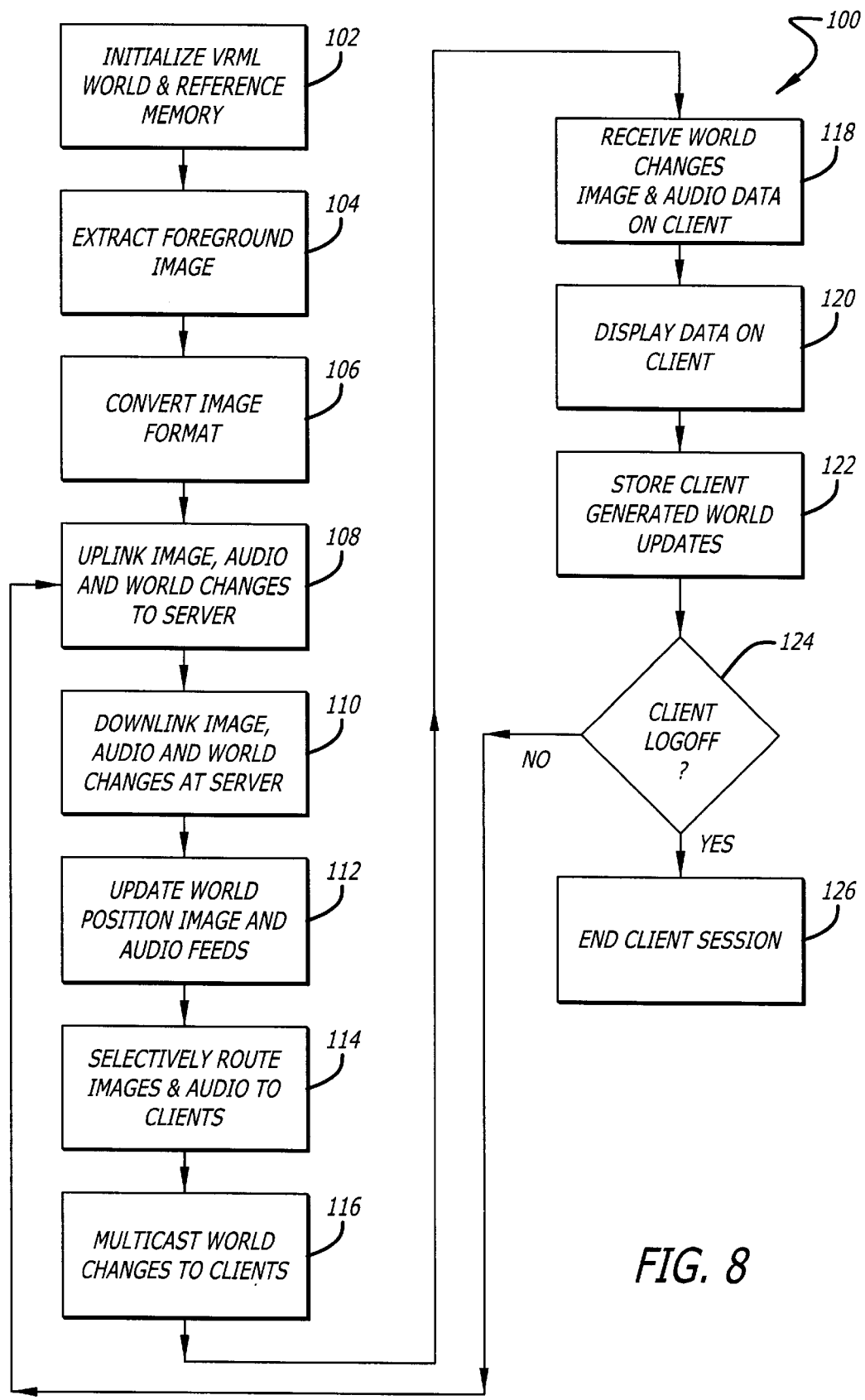
FIG. 8 is a flow diagram illustrative of the method of the present invention.

FIG. 8 is a flow diagram illustrative of the method of the present invention. As shown in FIG. 8, the method 100 includes the step 102 of initializing the VRML world (*.wrl) and the reference frame memory on the client machine. At step 104 foreground image data is extracted. Those skilled in the art will appreciate that dynamic background image data may be extracted as well. At step 106 the image format is converted as discussed above. Next, at step 108, the extracted image data, associated (tagged) audio data and local world changes are uploaded to the server. At step 110, the server receives image streams from plural client machines. At step 112, the server updates the world and positions the objects having live image and audio data streams as provided by the client machines. Based on the locations of the objects, at step 114, the server software selectively routes image streams and associated audio downstream to the appropriate receiving client machines.

At step 116, at predetermined intervals, or on the occurrence of predetermined events, the server multicasts world changes to all client machines based on the authorizations thereof. For example, the server will not send changes to the environment in a building dedicated to a particular customer or tenant (such as AOL, Microsoft, Yahoo, etc.) to those clients that are not members of the tenant's clientele. At steps 118 and 120, the world changes, image and audio streams are received on the client machines and displayed. The user interacts with the world and the individuals virtually present therein via the live video and audio streams provided by the inventive system.

At step 124, the user's image and audio data and world changes (stored at step 122) are uploaded to the server (step 108) until the user logs off and the session ends at step 126.

Thus, in the illustrative application, a realistic virtual city is created in accordance with the Virtual Reality Modeling Language (VRML) protocol. The extracted images are transplanted onto an object in the environment as a texture. In the best mode, the object is invisible. The extracted video images are streamed continuously into the environment such that a live real time interaction is enabled. The system transplants the extracted video images into the environment in a manner that preserves the virtual metaphor thereof. The environment is networked and the system is adapted to receive multiple simultaneous streams that are transplanted and exported to enable a virtual community.

Multiple sequences of extracted images may be stored either locally or on the server so that, users seated in their native environment, appear to walk when navigating due to the unique teaching of the present invention by which a series of stored extracted images of the user walking are transplanted into the environment and replayed for so long as the user is navigating. A separate series is displayed to each person within a predetermined range of the walker that has the walker in his field of view depending on the viewing angle of the observer. As per the image extraction and transplantation software, the software for providing the stored sequences on the detection of navigation of a seated user may be implemented via an applet or agent. within the VRML world code (*.wrl).

A master copy of the environment is stored on a server and downloaded to each client on the network as part of a setup process. Thereafter, local changes in the environment are uploaded to the server and subsequently downloaded to selected clients as updates. The environment will support private areas and the system is adapted to allow extracted video streams within private environments to be sent to each person in the private environment directly, bypassing the server. Also, lighting conditions in the virtual city may change to reflect the movement of the sun in the real world.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for transplanting extracted video image data comprising:

first means for providing a multi-dimensional computer generated environment, said first means including means for providing a three-dimensional computer generated environment, said environment including at least one object;

second means for receiving a plurality of video images extracted from a heterogeneous background; and third means for transplanting said extracted video images into said environment, said third means including means for transplanting at least some of said extracted images into said environment as a texture on said object.

2. A system for transplanting extracted video image data comprising:

first means for providing a multi-dimensional computer generated environment;

second means for receiving a plurality of video images extracted from a heterogeneous background; and third means for transplanting said extracted video images into said environment.

3. The invention of claim 2 wherein said environment includes at least one invisible object.

4. The invention of claim 3 wherein said third means includes means for transplanting at least some of said extracted images on said invisible object.

5. The invention of claim 2 wherein said extracted video image data includes dynamic foreground image data and excludes static background image data with respect to a native environment.

6. The invention of claim 2 wherein said extracted video images are streamed continuously.

7. The invention of claim 6 wherein said environment is a networked virtual environment.

8. The invention of claim 7 wherein said second means includes means for receiving plural simultaneous streams of extracted image data.

9. The invention of claim 8 wherein said third means includes means for transplanting said plural simultaneous streams of extracted image data.

10. The invention of claim 9 further including means for exporting at least one of said plural simultaneous streams of extracted image data.

11. The invention of claim 10 further including means for exporting a plurality of said simultaneous streams of extracted image data.

12. The invention of claim 11 further including means for selectively exporting said plurality of said simultaneous streams of extracted image data depending on a viewing angle of a participant in said networked virtual environment.

13. The invention of claim 11 wherein said means for exporting includes a server.

14. The invention of claim 13 further including means for effecting communication of at least one stream from a first participant to a second participant while bypassing said server.

15. The invention of claim 2 wherein said extracted video images are stored.

16. The invention of claim 15 wherein a subset of said stored images is transplanted depending on a viewing angle of an observer.

17. The invention of claim 2 wherein said second means includes a network.

18. The invention of claim 17 wherein said network is the Internet.

19. The invention of claim 17 wherein said network is an Intranet.

20. The invention of claim 17 wherein said network is a broadcast network.

21. The invention of claim 17 wherein said network is a multi-cast network.

22. The invention of claim 17 wherein said network is a wireless network.

23. The invention of claim 2 wherein said images are transplanted depending on a viewing angle of an observer.

24. A system for transplanting extracted video image data comprising:
   first means for providing a multi-dimensional computer generated environment, said first means including means for providing a three-dimensional computer generated environment, said environment including at least one computer generated building, said first means includes means for adjusting the height of said building based on the amount of traffic therethrough;
   second means for receiving a plurality of extracted video images; and
   third means for transplanting said extracted video images into said environment.

25. The invention of claim 24 wherein said first means includes means for adjusting the height of said building based on the amount of traffic therethrough averaged over a predetermined time period.

26. A system for transplanting extracted video image data comprising:
   first means for providing a multi-dimensional computer generated environment, said environment including at least one computer generated building, said first means includes means for adjusting the color of said building based on the amount of traffic therethrough;
   second means for receiving a plurality of extracted video images; and
   third means for transplanting said extracted video images into said environment.

27. The invention of claim 26 wherein said first means includes means for adjusting the color of said building based on the amount of instantaneous traffic therethrough.

28. A system for depicting a walking motion of a video avatar comprising:
   first means for providing a multi-dimensional computer generated environment said first means including means for providing a three-dimensional computer generated environment created in accordance with the Virtual Reality Modeling Language protocol, said environment including at least one object;
   second means for receiving a plurality of extracted video images extracted from a heterogeneous background;
   third means for storing a set of said extracted images; and
   fourth means for transplanting a series of said set of extracted video images into said environment depending on a viewing angle of an observer, said third means including means for transplanting at least some of said extracted images into said environment as a texture on said object.

29. The invention of claim 28 wherein said series of images represent a user in motion.

30. The invention of claim 29 wherein said motion is walking.

31. The invention of claim 30 wherein said series of images are repeated continuously while said user is navigating in said environment.

32. A system for transplanting extracted video image data comprising:
   first means for providing a multi-dimensional computer generated networked virtual environment, said first means including means for providing a three-dimensional computer generated environment created in accordance with the Virtual Reality Modeling Language protocol, said environment including at least one object;
   second means for receiving plural simultaneous continuous streams of video images extracted from a heterogeneous background, said second means further including means for selectively exporting at least one of said plural simultaneous streams of extracted image data depending on a viewing angle of a participant in said networked virtual environment; and
   third means for transplanting said selectively exported simultaneous stream of extracted video images into said environment, said third means including means for transplanting at least some of said extracted images into said environment as a texture on said object.

33. A system for transplanting extracted video image data comprising:
   first means for providing a multi-dimensional computer generated environment;
   second means for receiving a plurality of video images extracted from a heterogeneous background; and
   third means for transplanting a subset of said extracted video images into said environment depending on a viewing angle of an observer.

34. A system for transplanting extracted video image data comprising:
   first means for providing a multi-dimensional computer generated environment;
   second means for receiving a plurality of video images extracted from a heterogeneous background; and
   third means for transplanting a subset of said extracted video images into said environment in real time.

* * * * *